Aug. 29, 1961  G. H. MOORE, JR  2,998,080
AUTOMATICALLY ADJUSTABLE PROPELLER
Filed July 22, 1958  2 Sheets-Sheet 1

INVENTOR:
GEORGE H. MOORE, JR.
BY
ATTORNEY

Aug. 29, 1961      G. H. MOORE, JR      2,998,080
AUTOMATICALLY ADJUSTABLE PROPELLER
Filed July 22, 1958      2 Sheets-Sheet 2
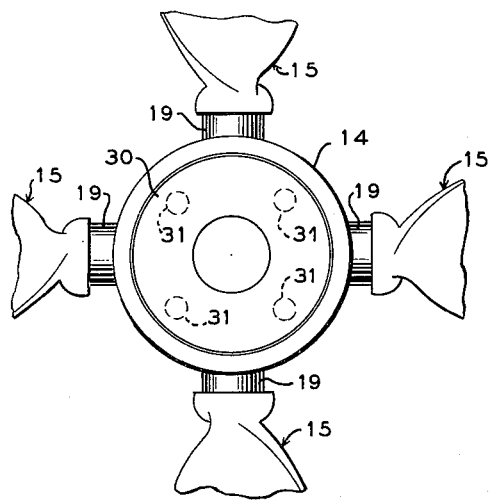
FIG. 3
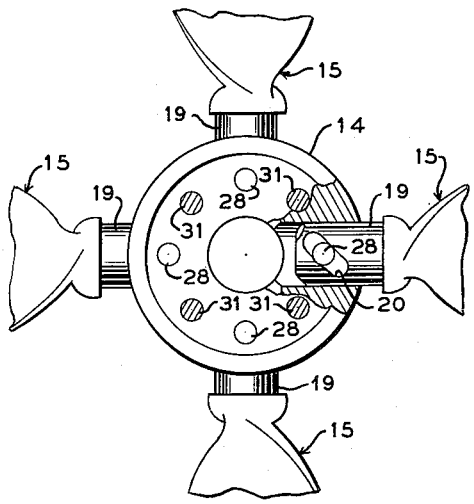
FIG. 4
FIG. 5(a)      FIG. 6(a)      FIG. 7(a)
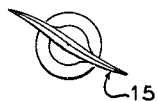        
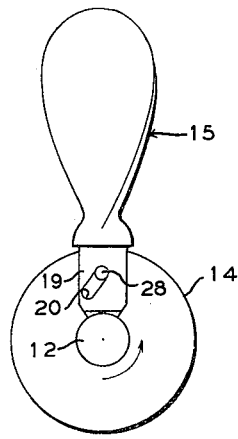    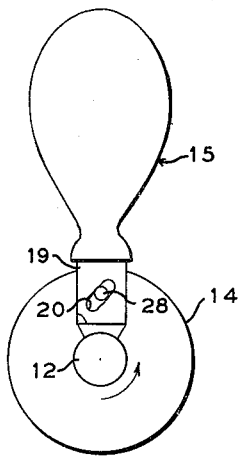    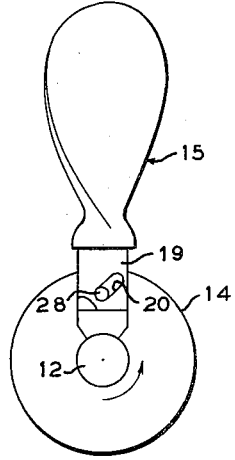
FIG. 5(b)      FIG. 6(b)      FIG. 7(b)
INVENTOR:
GEORGE H. MOORE, JR.
BY:
ATTORNEY United States Patent Office
2,998,080
Patented Aug. 29, 1961

2,998,080
AUTOMATICALLY ADJUSTABLE PROPELLER
George H. Moore, Jr., 752 Lee St., Smyrna, Ga.
Filed July 22, 1958, Ser. No. 750,184
1 Claim. (Cl. 170—160.11)

This invention relates to propellers, and more particularly concerns marine-type propellers having means for automatically varying propeller blade pitch under operating conditions.

At very low forward speeds of boats and other propeller driven craft, the efficiency of propellers with large blade pitch, as would be most suitable for cruising, is much less than those with low pitch, allowing the motor to develop only about 75% of its full power. Fixed-pitch propellers, then, do not permit the potential motor power to be effectively utilized throughout the entire range of speeds of the vehicle associated therewith.

One of the objects of this invention is to provide a new and improved propeller mechanism that automatically assumes a pitch angle which is ideal for a given r.p.m., load, and vehicular velocity, and which is readily adjustable to suit a wide variety of operating conditions and motor torque characteristics.

Another object of this invention is to provide a new and improved propeller having an automatic pitch adjusting mechanism which may be manually limited so as to permit maximum propeller r.p.m. at any desired pitch.

A further object of this invention is to provide a new and improved propeller mechanism having an automatic pitch adjusting arrangement in which the degree of pitch change per change in r.p.m. may be matched with any desired motor torque curve ranging from 90° reverse to 90° forward pitch.

Still another object of this invention is to provide a new and improved propeller mechanism which provides for automatic positive reversing, manually limited reversing and/or automatic feathering of the propeller blades in the event of motor failure.

A still further object of this invention is to provide a new and improved propeller mechanism which uniformly and simultaneously varies the pitch of a plurality of propeller blades commensurate with the speed of the propelled vehicle and motor r.p.m.

An additional object of this invention is to provide a new and improved variable pitch propeller which, although rugged and dependable, is simple in construction and operation and readily lends itself to the demands of economic manufacture.

Numerous other objects, features and advantages of my invention will become apparent from consideration of the following description taken in conjunction with the accompanying drawings wherein like reference characters refer to the same or similar parts throughout the several views, and in which:

FIG. 3 is a cross sectional view taken along the line 3—3 of FIG. 1.

FIG. 4 is a cross sectional view, partly broken away, taken along the line 4—4 of FIG. 1.

FIGS. 5(a) and 5(b) are schematic representations showing the relationship between propeller pitch and radial displacement at low r.p.m.

FIGS. 6(a) and 6(b) are schematic representations showing the relationship between propeller pitch and radial displacement at intermediate r.p.m.

FIGS. 7(a) and 7(b) are schematic representations showing the relationship between propeller pitch and radial displacement at full r.p.m.

Figure 1:
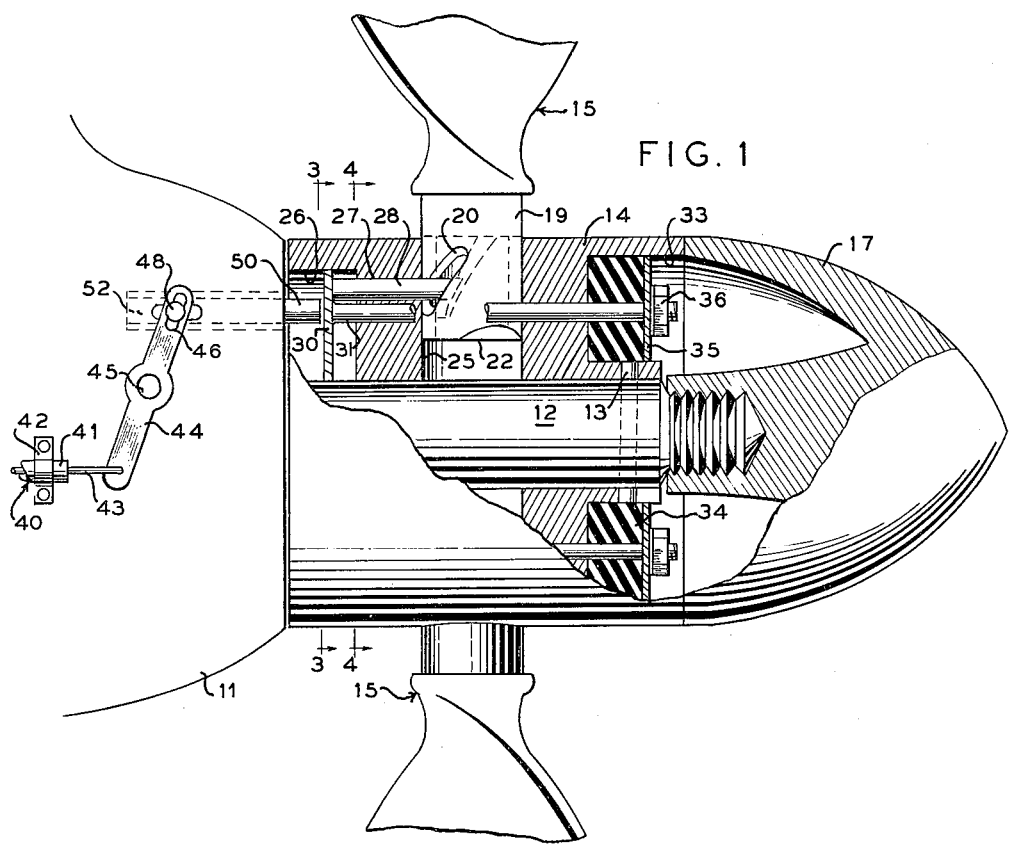
FIG. 1 is a side elevation, partly broken away, showing the motor gear housing with the automatic propeller mechanism of my invention attached thereto.

Referring now particularly to FIG. 1, the arrangement therein shown includes a motor gear housing 11 from which extends a propeller drive shaft 12. Secured to drive shaft 12, as by shear pin 13, is the propeller hub 14 having blades, as at 15, radially extending therefrom. Threadedly secured to the outer end of drive shaft 12 is the conventional spinner 17 which is of generally aerodynamic configuration having a maximum outer diameter approximately the same as that of the propeller hub.

Figure 2:
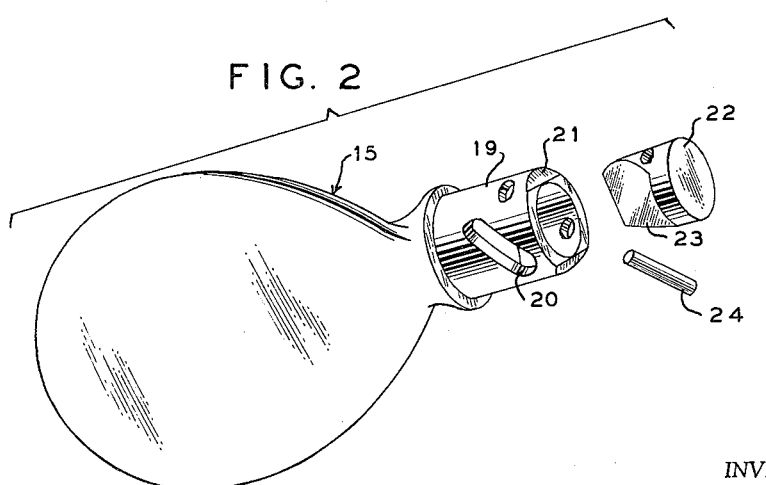
FIG. 2 is a detail, partly exploded, showing a blade helix slot and cam arrangement according to my invention.

For a better understanding of the blade adjusting mechanism of my invention, reference is made to FIG. 2 which shows a blade 15 having a hollow stem 19 that is formed with a helical cut-out or slot 20. Adapted for securement within hollow stem 19 is the plug 22 which is provided with a helicoidal surface 23, the arrangement being such that plug 22 is retained within stem 19 by the cross pin 24. The hub 14 is formed with a plurality of radial bores 25 each adapted for rotatable reception of a blade stem 19. The base of stem 19 is formed with diametrically opposed bevels 21 which would be desirable in embodiments of the invention having four or more blades so as to maintain clearance between the stems in their innermost radial position in the hub. It is recognized, of course, that the invention lends itself readily to any balanced configuration of blades.

Communicating each stem bore 25 with the forward hub recess 26 is a bore 27 which slidably receives a camming pin 28, the arrangement being such that pin 28 passes through helical slot 20 in stem 19 for slidable engagement with helicoidal surface 23 of plug 22. The relationship of angularity of helical slot 20 with the helicoidal surface 23 is chosen to provide a constant mechanical advantage between blade 15 and camming pin 28, as is well understood by those skilled in the art.

Adapted for abutting relation with the forward end of camming pin 28 is the annular blade synchronizer plate 30, shown in FIGS. 1 and 3 as supported on connecting rods 31 which slidably extend through hub 14 for selective positioning therein for purposes that will hereafter become apparent. The rearward end of hub 14 is formed with the annular recess 33 for housing the annular resilient member 34 made preferably of rubber, which is maintained therein by a pressure plate 35, the arrangement being such that connecting rods 31 extend through resilient member 34 and pressure plate 35 for securement therebeyond by nuts 36. From this arrangement, it can be seen that threadable positioning of nuts 36 on guides 31 provides for pre-loading adjustment of resilient member 34.

Considering the operation of the foregoing construction, it can be seen that centrifugal force resulting from rotation of the sub effects outward radial movement of the blades with respect to drive shaft 12, as more clearly seen in FIGS. 1 and 4. Such outward movement of each blade is accompanied by rotation thereof resulting from engagement of the periphery of helical slot 20 in stem 19 against camming pin 28. In addition, as each blade 15 moves outwardly, helicoidal surface 23 of plug 22 abuts camming pin 28 driving the same against blade synchronizer plate 30 which in turn moves connecting rods 31 so as to effect compressive movement of pressure plate 35 against resilient member 34. Upon reduction in the r.p.m. of the propeller hub, resilient member 34 forces pressure plate 35 outwardly, carrying therewith connecting rods 31 which cause blade synchronizer plate 30 to force each camming pin 28 against its associated helicoidal surface 23 to urge each blade 15 to rotate inwardly so as to effect a reduction in pitch and propeller diameter.

It can be seen then that the change in pitch proportional to such radial displacement of each blade 15 is determined by the angularity of the helical slot 20 in stem 19. In addition, because of the relationship of helical slot 20 and helicoidal surface 23 with camming pin 28, propeller diameter and pitch characteristics can be readily matched to motor torque characteristics to obtain maximum efficiency merely by providing a member 34 of different resiliency. More generally, however, propeller diameter and pitch are a function of the angularity of helical slot 20, the configuration of surface 23, motor r.p.m. and the resiliency of member 34, each of which could be varied to effect a proper match of the propeller to motor torque characteristics so as to permit maximum motor power to be developed over the entire range of vehicle speeds.

From the foregoing it can be seen then the propeller mechanism of my invention automatically effects a pitch angle which is ideal for a given r.p.m., a given load and a given vehicular velocity, so as to effectively replace an infinite number of fixed blade propellers for a given installation. It will further provide for automatic feathering, greater power at lower vehicle speed, greater acceleration, and a higher top speed for a given power plant installation.

The present invention also provides for reversing the propeller so as to effect reverse travel of the vehicle therewith. For this purpose a control Bowden wire 40 extends from adjacent the operator of the vehicle to the base of the motor gear housing 11, having its outer or guide cable 41 secured to the housing by clamp 42. The inner Bowden cable 43 is secured to the lower end of arm 44 which is pivoted about the pin 45 secured to housing 11. The upper end of arm 44 is formed with a slot 46 that positions the roller pin 48 on the end of the restricting rod 50 which is adapted for slidable movement in a bore within housing 11, the arrangement being such that the roller pin 48 extends through slot 52 in the side of the housing. From this construction it can be seen that movement of inner Bowden wire 43 effects an equal but opposite movement of restricting rod 50 so as to position rod 50 for limiting abutment with blade synchronizer plate 30 carried within hub 14. It will be recognized, of course, that the abutting end of restricting rod 50 may be provided with a suitable antifriction or roller arrangement so as to minimize the shearing force thereagainst.

In considering the operation of the invention with restricting rod 50, attention is directed to FIGS. 5(a) and 5(b) which show the blade pitch at low r.p.m. to be such that low radial displacement thereof takes place. Referring momentarily to FIG. 1, it can be seen that if restricting rod 50 be actuated to abutting position against blade synchronizer plate 30, an increase in r.p.m. will have no effect toward changing blade pitch because camming pin 28 is prevented from moving further into forward recess 28. In this position of rod 50, then, the motor can be given full throttle for maximum r.p.m., if desired, so as to effect rearward movement of the vehicle. Upon release or return of restricting rod 50 to non-abutting position as by proper actuation of Bowden wire 40, an increase in motor r.p.m. will cause outward radial movement of the propeller blades by centrifugal force thereon so as to take the position as shown in FIGS. 6(a) and 6(b), each propeller blade passes through an area of zero pitch. Additional increase in motor r.p.m., however, causes each blade 15 to move to its maximum outward radial position, as shown in FIGS. 7(a) and 7(b). It should be also noted that the propeller mechanism of my invention can be used as a brake merely by a quick decrease in r.p.m., permitting automatic return of the pitch to its static or low r.p.m. position of reverse pitch, with subsequent engagement of restricting rod 50, and increase in r.p.m.

In reviewing the function of the propeller mechanism of my invention it can be seen that as r.p.m. is increased the pitch of each propeller blade proportionally increases along with an increase in propeller diameter so as to store a force equal to the centrifugal force on the propellers at any given r.p.m. in resilient member 34 housed in the rear of hub 14. As motor r.p.m. is decreased, the resulting decrease in centrifugal force effects a commensurate decrease in the propeller diameter and pitch angle as a result of the re-expansion of the resilient member 34. At any given r.p.m. within the operating range of the propeller, of course, the diameter and pitch thereof will either increase or decrease until a state of equilibrium is obtained.

Where a pitch change above a given point is not desired, however, actuation of restraining rod 50 may be utilized to prevent further pitch increase, so as to permit maximum r.p.m. at any particular pitch setting of the propeller blades, supplementing the automatic reversal limiting function heretofore described. It is also to be considered that since each blade mechanism is independently affected by centrifugal force, synchronizer plate 30 insures a uniform distribution of force to all blades simultaneously, and, in effect, provides for pitch synchronization for all blades.

The invention further provides means for adjusting the pre-load on resilient member 34, as by adjustment of nuts 36, whereby a propeller diameter increase or blade pitch change cannot be effected until a predetermined centrifugal force is imposed on the blades greater than the pre-load force, as might be desirable in some applications.

It should also be considered that the propeller mechanism of my invention is primarily intended for marine power plant installations, but could be advantageously employed with aircraft or in any other field where a propeller is utilized. It will further be recognized that the propeller blades at low r.p.m. could be at any desired pitch setting, and that a wide variety of pitch to r.p.m. relationships could be obtained by changing the configuration of slot 20 and/or of the helicoidal surface 23.

From the foregoing it will be apparent that I have provided a propeller which is well adapted to fulfill the aforestated objects of the invention. Moreover, whereas the invention has been disclosed in particularity with respect to an embodiment which gives satisfactory results, it will be understood by those skilled in the art to which the invention most nearly appertains, that additional embodiments and modifications thereof may be provided without departing from the spirit or scope of the invention as defined by the appended claim.

I claim:

Propeller mechanism for use with a rotatable drive shaft, comprising a hub member adapted to be secured to said shaft, a plurality of blades journaled in said hub member, a resilient member positioned in said hub member, each of said blades including a camming surface rotatable therewith, pins slidable in said hub, each of said pins having one end engaging a respective one of said camming surfaces, a synchronizer plate engaging the other end of said pins, and means connecting said synchronizer plate with said resilient member, whereby movement of said synchronizer plate will vary the load on said resilient member in response to radial and pitch-change movements of said blades.

References Cited in the file of this patent

UNITED STATES PATENTS

| | | |
|---|---|---|
| 1,386,490 | Boerner | Aug. 2, 1921 |
| 1,907,504 | Chilton | May 9, 1933 |
| 2,052,454 | Ellwood | Aug. 25, 1936 |
| 2,099,922 | Bellman | Nov. 23, 1937 |

FOREIGN PATENTS

| | | |
|---|---|---|
| 425,914 | Great Britain | Mar. 25, 1935 |